(12) United States Patent
Sun et al.

(10) Patent No.: US 10,707,787 B2
(45) Date of Patent: Jul. 7, 2020

(54) MOTOR DRIVING CIRCUIT, MOTOR DRIVING METHOD, AND MOTOR UTILIZING THE SAME

(71) Applicant: Johnson Electric International AG, Murten (CH)

(72) Inventors: Chiping Sun, Hong Kong (HK); Shinghin Yeung, Hong Kong (HK); Haibo Jiang, Shenzhen (CN); Guodong Liu, Shenzhen (CN); Shujuan Huang, Shenzhen (CN)

(73) Assignee: Johnson Electric International AG, Murten (CH)

( * ) Notice: Subject to any disclaimer, the term of this patent is extended or adjusted under 35 U.S.C. 154(b) by 0 days.

(21) Appl. No.: 16/111,288

(22) Filed: Aug. 24, 2018

(65) Prior Publication Data

US 2019/0068094 A1 Feb. 28, 2019

(30) Foreign Application Priority Data

Aug. 25, 2017 (CN) .......................... 2017 1 0744486

(51) Int. Cl.
*H02P 6/28* (2016.01)
*H02P 25/026* (2016.01)
(Continued)

(52) U.S. Cl.
CPC ................ *H02P 6/28* (2016.02); *H02P 1/465* (2013.01); *H02P 6/15* (2016.02); *H02P 6/16* (2013.01);
(Continued)

(58) Field of Classification Search
CPC ........... B65H 2220/01; B65H 2513/50; B60W 10/06; B60W 10/08; B60K 6/48
See application file for complete search history.

(56) References Cited

U.S. PATENT DOCUMENTS 3,941,033 A * 3/1976 Olsen ..................... B62D 5/061
91/446
4,012,678 A * 3/1977 Blaha ....................... H02P 1/44
318/794
(Continued)

FOREIGN PATENT DOCUMENTS

EP 0682404 * 11/1995
EP 0682404 A2 11/1995
(Continued)

OTHER PUBLICATIONS

EP0682404 has been attached.*
Search Report of European Patent Application No. 18190525.8 dated Dec. 20, 2018.

*Primary Examiner* — Kawing Chan
*Assistant Examiner* — Zoheb S Imtiaz

(57) ABSTRACT

A motor, a driving circuit thereof and a driving method thereof are provided. The motor driving method includes: during a motor starting stage, when a detected rotor magnetic field is a first polarity and a polarity of an AC power source is positive, or the detected rotor magnetic field is a second polarity and the polarity of the AC power source is negative after a zero voltage crossing point of the AC power source, instantly sending a trigger pulse to a controllable bidirectional AC switch connected in series with a motor winding at both ends of the AC power source; during a motor operating stage, after the zero voltage crossing point of the AC power source, sending a trigger pulse to the controllable bidirectional AC switch after a delay time after the zero voltage crossing point. This method can provide a large torque during the motor starting stage.

7 Claims, 10 Drawing Sheets

(51) Int. Cl.
*H02P 6/15* (2016.01)
*H02P 6/16* (2016.01)
*H02P 1/46* (2006.01)
*H02P 25/03* (2016.01)
*H02P 6/30* (2016.01)
*H02P 29/032* (2016.01)

(52) U.S. Cl.
CPC .............. *H02P 6/30* (2016.02); *H02P 25/026* (2013.01); *H02P 25/03* (2016.02); *H02P 29/032* (2016.02)

(56) References Cited

U.S. PATENT DOCUMENTS

| | | | | |
|---|---|---|---|---|
| 4,190,793 | A * | 2/1980 | Parker | H02P 27/026 318/800 |
| 4,503,370 | A * | 3/1985 | Cuneo | H02P 25/14 388/819 |
| 4,520,259 | A * | 5/1985 | Schoenberger | F24H 9/2021 219/501 |
| 4,786,850 | A * | 11/1988 | Chmiel | H02P 1/44 318/785 |
| 5,650,697 | A * | 7/1997 | Imagi | H02P 25/14 318/400.3 |
| 5,666,739 | A * | 9/1997 | Krueger | D06F 58/26 34/513 |
| 5,675,226 | A * | 10/1997 | Riola' | H02K 29/03 318/400.26 |
| 5,796,194 | A * | 8/1998 | Archer | H02K 29/12 310/184 |
| 6,239,563 | B1 * | 5/2001 | Kunz | H02P 1/465 318/400.07 |
| 6,459,606 | B1 * | 10/2002 | Jadric | H02M 5/297 363/163 |
| 2003/0178966 | A1 * | 9/2003 | Marioni | H02P 6/20 318/690 |
| 2003/0230999 | A1 * | 12/2003 | de Nanclares | H02P 1/465 318/716 |
| 2004/0145336 | A1 * | 7/2004 | Marioni | H02K 29/08 318/717 |
| 2005/0184708 | A1 * | 8/2005 | Pippin | G05F 1/70 323/235 |
| 2006/0017418 | A1 * | 1/2006 | Ikeda | H02P 1/42 318/788 |
| 2006/0055364 | A1 * | 3/2006 | Park | H02P 1/445 318/788 |
| 2007/0164700 | A1 * | 7/2007 | Schwarz | H02P 1/42 318/778 |
| 2011/0058288 | A1 * | 3/2011 | Vanko | B25F 5/00 361/33 |
| 2018/0208023 | A1 * | 7/2018 | Kashima | H02P 27/04 |
| 2019/0068094 | A1 * | 2/2019 | Sun | H02P 29/032 |

FOREIGN PATENT DOCUMENTS

| | | |
|---|---|---|
| EP | 0945973 A2 | 9/1999 |
| EP | 1775831 A2 | 4/2007 |
| EP | 2983288 A1 | 2/2016 |

* cited by examiner

MOTOR DRIVING CIRCUIT, MOTOR DRIVING METHOD, AND MOTOR UTILIZING THE SAME

CROSS REFERENCE TO RELATED APPLICATIONS

This non-provisional patent application claims priority under 35 U.S.C. § 119(a) from Patent Application No. 201710744486.3 filed in the People's Republic of China on Aug. 25, 2017.

FIELD OF THE DISCLOSURE

The present disclosure relates to a motor driving technique, and more particularly to a motor driving circuit, a motor driving method, and a motor employing the driving circuit.

BACKGROUND OF THE DISCLOSURE

Motor is an electromagnetic device that converts or transmits electric energy according to the law of electromagnetic induction. Its main role is to generate drive torque as a power source for appliances or various machineries. Single-phase permanent magnet motors are widely used in various electrical products such as exhaust fans and water pumps due to their simple operation and convenient control. A conventional motor driving method sends a trigger pulse to a controllable bidirectional AC switch after a delay time after a zero voltage crossing point of the AC power source, such that a reaction motor torque generated by the 180-degree phase difference between back electromotive force (Bemf) and motor current is decreased and the wastage of electrical energy is reduced. However, in some applications, such as when the motor is connected to a relatively large-diameter fan, during a starting stage, a high motor starting torque is required to overcome a large inertia of the fan, but the conventional method reduces the current conduction period, as a result, the motor cannot start normally.

SUMMARY OF THE DISCLOSURE

Thus, there is a need to provide a motor driving circuit having a simple structure, a motor having the motor driving circuit, and a motor drive method, which can provide a large starting torque when the motor is started.

Accordingly, in one aspect thereof, the present disclosure provides a motor driving method, the method includes:

during a motor starting stage, when a detected rotor magnetic field is a first polarity and a polarity of an AC power source is positive, or the detected rotor magnetic field is a second polarity and the polarity of the AC power source is negative after a zero voltage crossing point of the AC power source, instantly sending a trigger pulse to a controllable bidirectional AC switch connected in series with a motor winding at both ends of the AC power source at the zero voltage crossing point of the AC power source; and during a motor operating stage, when the detected rotor magnetic field is the first polarity and the polarity of the AC power source is positive, or the detected rotor magnetic field is the second polarity and the polarity of the AC power source is negative after a zero voltage crossing point of the AC power source, sending a trigger pulse to the controllable bidirectional AC switch after a delay time after the zero voltage crossing point.

In another aspect thereof, the present disclosure provides a driving circuit for a motor including a stator and a permanent magnet rotor, the stator includes a stator core and a stator winding wound on the stator core, wherein the driving circuit includes:

a controllable bidirectional AC switch connected in series with the stator winding between two ends of an AC power source; and a processing unit, configured to instantly send a trigger pulse to the controllable bidirectional AC switch, when a detected rotor magnetic field is a first polarity and a polarity of the AC power source is positive, or the detected rotor magnetic field is a second polarity and the polarity of the AC power source is negative after a zero voltage crossing point of the AC power source, during a motor starting stage; and the processing unit configured to send a trigger pulse to the controllable bidirectional AC switch after a delay time after the zero voltage crossing point, when the detected rotor magnetic field is the first polarity and the polarity of the AC power source is positive, or the detected rotor magnetic field is the second polarity and the polarity of the AC power source is negative after the zero voltage crossing point of the AC power source, during a motor operating stage.

In another aspect thereof, the present disclosure provides a motor including the motor driving circuit described above, and the motor is a single phase permanent magnet synchronous machine or a single phase permanent magnet BLDC motor.

In the embodiments of the present disclosure, the driving process of the motor includes a starting stage phase and an operating stage. In these two phases, different control methods are adopted for the motor. In our company, the method to use or eliminate the trigger angle delay based on the motor phase or conditions is called adaptive phase angle control. In the starting stage, the trigger pulse is instantly sent to the controllable bidirectional AC switch after zero voltage crossing point of the AC power source, so that the current conduction period becomes longer and the starting torque of the motor is increased. In the operating stage, the trigger angle delay control manner is adopted to reduce the counteracting motor torque generated by the 180-degree phase difference between back electromotive force (Bemf) and motor current, such that improving the efficiency of the motor.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
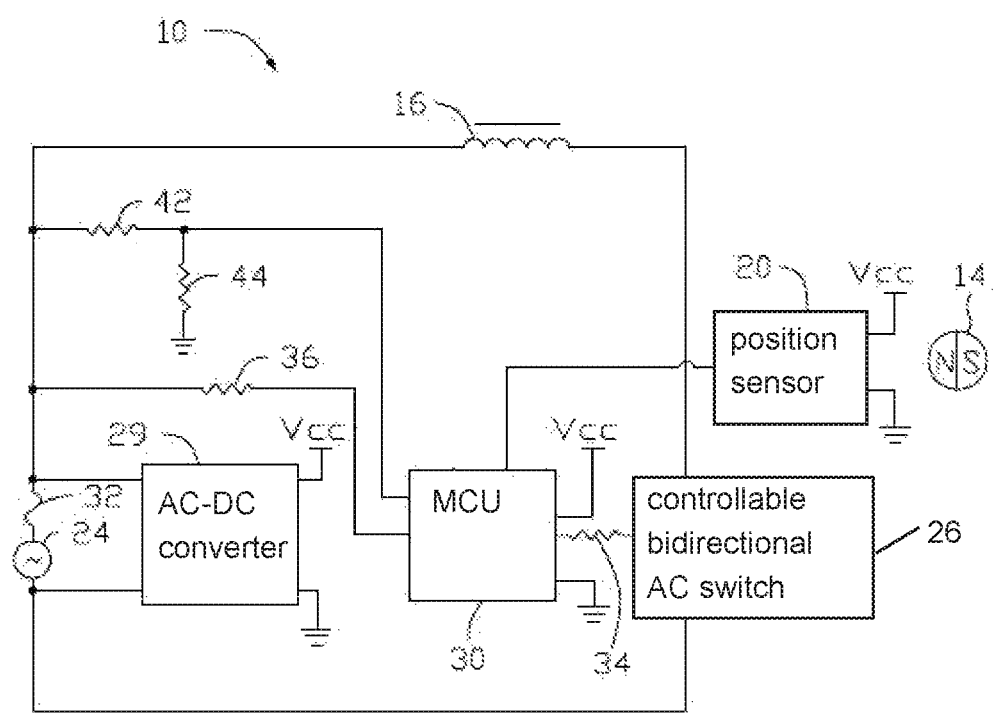
FIG. 1 is a circuit diagram of a motor driving circuit according to a first embodiment of the present disclosure.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the disclosure. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the disclosure.

FIG. 1 schematically shows a motor 10 according to a first embodiment of the present disclosure. The motor 10 takes a synchronous motor as an example. The motor 10 includes a stator, a permanent magnet rotor 14 rotatably disposed within magnetic poles of the stator, and a motor driving circuit. The stator includes a stator core 12 and a stator winding 16 wound on the stator core 12. The rotor 14 is a permanent rotor.

A position sensor 20 for detecting a magnetic field of the rotor is disposed on the stator or at a position near the rotor 14 inside the stator. In the embodiment, the motor driving circuit includes a controllable bidirectional AC switch 26, a microcontroller unit (MCU) 30, the position sensor 20, an AC-DC converter 29, and a fuse 32. The controllable bidirectional AC switch 26, the stator winding 16 and the fuse 32 are connected in series between two ends of an AC power source 24. The AC power source 24 may be a commercial AC power supply, for example, 220V or 230V, or an AC power supply output from an inverter.

Preferably, the controllable bidirectional AC switch is a TRIAC. It can be understood, the controllable bidirectional AC switch is not limited to being the TRIAC, for example, it can be realized by two silicon-controlled rectifiers (SCRs) connected inversely in parallel.

The AC-DC converter 29 is connected between a first end and a second end of the AC power source 24 via the fuse 32. The MCU 30 is connected to a DC power supply terminal Vcc, the voltage of the DC power supply terminal Vcc can be obtained by converting the AC voltage from the AC power source 24 into a low DC voltage by the AC-DC converter 29. The position sensor 20 is also connected to the DC power supply terminal Vcc and receives a working voltage. The position sensor 20 is configured for detecting the magnetic field of the rotor 14 of the motor 10 and outputting a corresponding magnetic pole position signal to the MCU 30. It can be understood that, the voltage provided to the MCU 30 and the voltage provided to the position sensor 20 may be the same or not the same, for example, the voltage provided to the MCU 30 may be 3.3V, and the voltage provided to the position sensor 20 may be 5V or 12V.

The MCU 30 obtains the magnetic pole position signal from the position sensor 20. The MCU 30 is connected to a control electrode of the controllable bidirectional AC switch 26 via a resistor 34. A zero crossing detection end of the MCU 30 is connected to the first end of the AC power source 24 via a resistor 36 for detecting a zero voltage crossing point of the AC power source. The resistor 36 is a resistor with megaohm values. In order to prevent excessive current from flowing into the MCU 30 and detecting the zero voltage crossing point of the AC power source under protected conditions, the zero crossing detection end of the MCU 30 still needs a voltage clamping circuit. A voltage polarity detection end of the MCU 30 is connected to the first end of the AC power source 24 via a resistor 42 for reducing the high voltage of the AC power source 24 to a working voltage of the microprocessor 30 to detect the voltage polarity of the AC power source 24 and the voltage value of the AC power source, and is grounded via a resistor 44. In other embodiments, the zero crossing detection end may be directly connected to the first end of the AC power source 24 without the resistor 36. The MCU 30 may not include the zero crossing detection end, and the voltage polarity detection end also acts as the zero crossing detection end. Each of the zero crossing detection end and voltage polarity detection end of the MCU 30 may include a voltage clamping circuit. The MCU 30 may include a waveform conversion unit (not shown), for reducing and offsetting the amplitude voltage of the AC power source in a certain percentage into a sine wave with a voltage between 0-vcc (a DC voltage). If the converted voltage value is greater than vcc/2, the polarity of the AC power source is deemed as positive, if the converted voltage value is less than vcc/2, the polarity of the AC power source is deemed as negative. The MCU 30 is configured to detect the zero voltage crossing point and voltage polarity of the AC power source 24, control the controllable bidirectional AC switch 26 to be switched between a switch-on state and a switch-off state in a predetermined way, based on the magnetic field of the rotor 14 and the voltage polarity of the AC power source 24.

In the present embodiment, only when the detected rotor magnetic field is North and the polarity of the AC power source is positive, or the detected rotor magnetic field is South and the polarity of the AC power source is negative, the MCU 30 outputs a trigger pulse to turn on the controllable bidirectional AC switch 26. When the detected rotor magnetic field is North and the polarity of the AC power source is negative, or the detected rotor magnetic field is South and the polarity of the AC power source is positive, the MCU 30 does not output a trigger pulse to the control electrode of the controllable bidirectional AC switch 26. Those skilled in the art can understand that, in other embodiments, the polarity of the AC power source, the rotor magnetic field, and the conduction state of the controllable bidirectional AC switch can be set according to an opposite logic to the present embodiment, which will not be described herein.

The product of back electromotive force (Bemf) and motor current contributes to the motor output power. However, if the product of Bemf and motor current is less than 0, i.e. if Bemf and motor current are out of phase, then negative torque (−T) will act against positive torque (+T), so the motor power efficiency is reduced. In the embodiments of the present disclosure, the driving process of the motor includes two stages, a starting stage and an operating stage. In the operating stage, when the polarity of the AC power source corresponds to the rotor magnetic field, the trigger pulse is sent to the controllable bidirectional AC switch after a predetermined delay time after the zero voltage crossing point of the AC power source. According to this control method, the motor is controlled to produce the expected torque as much as possible, the power consumption due to positive and negative torques resist each other is reduced, therefore, the efficiency of electrical energy utilization can be greatly improved. In the starting stage, when the back EMF is zero, in order to overcome the friction between the shaft and the shaft sleeve and the inertia of the motor load, obtain a larger starting torque to make the motor startup successfully, the trigger pulse is instantly sent to the controllable bi-directional AC switch to drive the rotor to rotate when the polarity of the AC power source corresponds to the rotor magnetic field. Therefore, the current flowing through the stator winding is as long as possible, and enough electric energy to overcome the inertia and friction of the motor at rest is obtained. The motor in the static state will not be powered when the AC power is at the peak or relatively high voltage, and the damage to semiconductor devices such as Triacs due to inrush currents is prevented.

During the operating stage of the motor, the delay time from the zero voltage crossing point of the AC power source to the transmission of the trigger pulse to the controllable bidirectional AC switch 26 may be determined based on at least one of the parameters consisting of voltage value of the AC power source, frequency of the AC power source, inductance value of the stator winding, internal resistance of the stator winding, temperature of the motor, temperature of environment surrounding the motor, and temperature of the MCU. Moreover, the greater the voltage value of the AC power source 24, the longer the delay time; or the voltage value of the AC power source is divided into a plurality of voltage value intervals, each voltage value interval corresponds to a delay time, the greater the voltage of the voltage value interval, the longer the delay time.

The lower the frequency of the AC power source 24, the longer the delay time; or the frequency of the AC power source is divided into a plurality of frequency intervals, each frequency interval corresponds to a delay time, and the lower the interval frequency, the longer the delay time.

The smaller the inductance value of the stator winding 16, the longer the delay time, or the inductance value of the stator winding is divided into a plurality of inductance value intervals, and each inductance value interval corresponds to a delay time, and the smaller the inductance value of the interval is, the longer the delay time is. The smaller the internal resistance of the stator winding 16, the longer the delay time.

When the delay time is determined based on the internal resistance of the stator winding 16, a temperature sensor (not shown) is preferably included in the motor driving circuit to detect the temperature of the motor or the temperature of environment surrounding the motor. Because the temperature will rise after the motor works, parameters such as internal resistance, inductance value, and magnetic induction intensity will change with the temperature. The changing degree of the internal resistance of the stator winding 16 with the temperature is greater than the changing degree of the inductance value. For example, when the temperature rises, the internal resistance and inductance value increase, but the magnetic induction intensity decreases. When the temperature decreases, the internal resistance and inductance value decrease, but the magnetic induction intensity increases. Changes of these parameters, such as internal resistance, inductance, and magnetic induction intensity, will eventually lead to the phase difference between the stator winding current and back electromotive force of the stator winding increasing or decreasing. Therefore, the temperature sensor is preferably included in the motor driving circuit to detect the temperature of the motor or the temperature of environment surrounding the motor, and the delay time is preferably changed with the temperature. As these parameters (e.g., internal resistance and inductance value) changing with temperature may have inverse impact on the phase difference between the stator winding current and Bemf of the stator winding, the relationship between the delay time and the detected temperature will be set up according to actual situation. For example, the lower the temperature, the longer the delay time. In some embodiments, establishing a plurality of temperature ranges, different temperature ranges correspond to different delay times. The lower the temperature range, the longer the delay time.

In an alternate embodiment, the temperature sensor may be integrated within the MCU for detecting the temperature of the MCU or the temperature of environment surrounding the motor. In some embodiments, the lower the temperature of the MCU, the longer the delay time, or establishing a plurality of temperature ranges, different temperature ranges correspond to different delay times, the lower the temperature of the temperature range, the longer the delay time.

Preferably, the MCU 30 stores a lookup table including a plurality of parameters about the voltage value of the AC power source, frequency of the AC power source, inductance value of the stator winding, and temperature of the motor (temperature of environment surrounding the motor, or temperature of the MCU) and the corresponding delay time (see table 1). The MCU 30 real-time detects the voltage value or the frequency of the AC power source 24, and real-time obtains temperature of the motor, environment surrounding the motor, or the MCU. The inductance value of the stator winding 16 can be pre-stored in the MCU. The MCU 30 finds out the delay time from the lookup table based on the parameters.

TABLE 1 lookup table of the delay time

| voltage value of the AC power source (input) | frequency of the AC power source | temperature | inductance value of the stator winding | delay time |
|---|---|---|---|---|
| 110 V > input > 96 V | 50 Hz | 40°-60° | 30-40 mH | D1 |
| ... | ... | ... | ... | ... |

In some embodiments, the delay time may be replaced with other parameters, such as firing angle, which is also capable of represent a delay. The delay time can be determined based on at least one of the parameters consisting of voltage value of the AC power source, frequency of the AC power source, inductance value of the stator winding, internal resistance of the stator winding, temperature of the motor, temperature of environment surrounding the motor, and temperature of the MCU. Each parameter may further be divided into several ranges, the firing angle is determined according to the range in which the parameter is located.

In the embodiment shown in FIG. 1, the MCU 30 is configured to detect the voltage value, zero voltage crossing point, voltage polarity of the AC power source 24. The controllable bidirectional AC switch 26 is switched between the switch-on state and the switch-off state in a predetermined way, based on the delay time or the firing angle corresponding to the voltage value of the AC power source, the zero voltage crossing point, the voltage polarity of the AC power source, and the rotor magnetic field. The purpose of the motor being controlled in such manner is simply to produce the expected torque during operation as far as possible and improve the motor efficiency significantly. The firing angle can be calculated according to the delay time, the amplitude of the AC power source, and the frequency of the power source.

Although in the embodiment the MCU 30 acts as a processing unit, it can be understood that, the MCU 30 can be replaced by any suitable electrical or semiconductor devices which can execute the above operations. For example, the processing unit may be ASIC, which is customized to the customer's needs, and further include the function of the Hall sensor. The ASIC has small volume, fast processing speed, and low manufacturing and support costs. In some embodiments, the position sensor is disposed on a first bare die, the data processing unit is disposed on a second bare die, and the first and second bare dies are integrated in the same IC package, and the package is a system-level package (System In Package, SIP). The MCU can also be replaced by discrete components, such as programmable logic device (PLD) or programmable array logic (PAL).

Figure 2A:
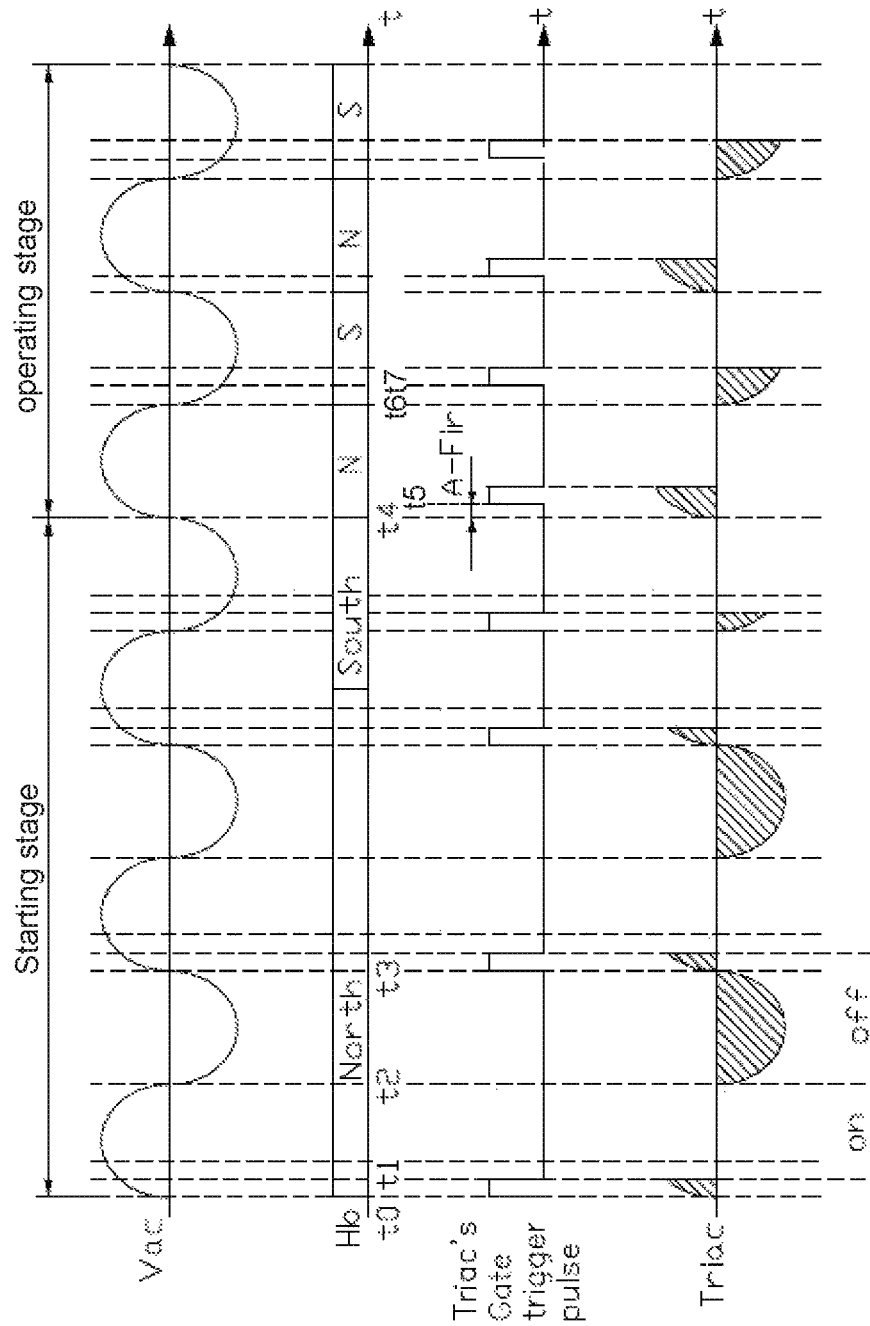
FIG. 2A is a waveform of the motor driving circuit of FIG. 1 when a load is a pure resistance load.

Referring to FIG. 2A, an operational principle of the motor driving circuit is illustrated. In FIG. 2A, Vac indicates a waveform of the voltage of the AC power source 24, Hb indicates the rotor magnetic field detected by the position sensor 20, and Triac's Gate trigger pulse indicates a trigger pulse provided to the control electrode of the controllable bidirectional AC switch 26. Triac indicates the state of the controllable bidirectional AC switch 26, on indicates the switch-on state, and off indicates the switch-off state (corresponding to the diagonal line part).

The AC power source 24 can be an electrical resource extracted from the power grid, which is fluctuant. As a result, the voltage provided by the AC power source 24 is fluctuant. Moreover, different countries have different voltage standards, for example, some national standards are 220 volts, and some national standards are 110 volts. The values of these voltages and the occurrence of fluctuations will impact on the operation of the motor. The AC power provided by the inverter may also be fluctuant. In this embodiment, the MCU 30 stores a lookup table including amplitudes or effective values of the AC power source and the corresponding firing angles (see table 2). The MCU 30 real-time detects the current voltage value of the AC power source 24, and calculates the amplitude or effective voltage of the AC power source based on the current voltage value and an angle corresponding to the current voltage value (the angle here refers to an angle from 0 to 360 degrees per cycle of the AC power source, for example, 90 degrees corresponds to the voltage amplitude). The MCU 30 further finds the corresponding firing angle from the lookup table according to the amplitude or the effective voltage value of the AC power source 24. Specifically, in the embodiment, the amplitude of the AC power source 24 is divided into a plurality of amplitude ranges, each of which corresponds to a firing angle. The MCU 30 determines which amplitude range the detected voltage value of the AC power source located in, and finds the corresponding firing angle according to the lookup table. In other embodiments, the MCU 30 may store a lookup table including some voltages at a predetermined angle (e.g., 30 degrees, 60 degrees, etc., from 0 to 360 degrees) and the corresponding firing angles. The MCU 30 instantly detects the voltage value of the AC power source 24 at the predetermined angle, and finds the corresponding firing angle from the lookup table based on the detected voltage value.

TABLE 2 lookup table including amplitudes of the AC power source and the corresponding firing angles

| amplitude of the AC power source input (Volts) | firing angle |
|---|---|
| 110 V > input > 96 V | AA |
| 120 V > input > 110 V | BB |
| ... | ... |
| 276 V > input > 230 V | XX |

In an alternative embodiment, the MCU 30 may store the delay time corresponding to the voltage of the AC power source 24 instead of storing the firing angle, and the delay time may be calculated based on the firing angle and the frequency of the AC power source.

In this embodiment, the firing angle or delay time is determined depending on the voltage value of the AC power source 24. The motor 10 can thus achieve a better power control in response to power grid voltage fluctuations and different national voltage standards.

The MCU 30 may also real-time detects the zero voltage crossing point of the AC power source 24, and determines whether the voltage polarity of the AC power source 24 changes from positive to negative, or from negative to positive. That is, when the zero voltage crossing point of the AC power source 24 is detected, the MCU 30 further determines the voltage polarity of the AC power source 24 following the zero voltage crossing point.

The position sensor 20 real-time detects the magnetic field of the rotor and transmits the corresponding magnetic pole position signal to the MCU 30. In the embodiment, the position sensor 20 is preferably a switch type Hall sensor. In the embodiment, in the case that the position sensor 20 is powered normally, the position sensor 20 outputs a logic high level when the detected rotor magnetic field is North, and outputs a logic low level when the detected rotor magnetic field is South. It should be understood that, in other embodiments, the position sensor 20 may also be a linear Hall sensor or an optoelectronic encoder, and one skilled in the art will appreciate that the magnetic pole position of the rotor may also be determined by a non-angular sensor method such as the Bemf zero crossing method. In other embodiments, the position sensor 20 may also be a switch type Hall sensor having opposite output states to those of the Hall sensor shown in the current embodiment.

After detecting the zero voltage crossing point of the AC power source 24, the MCU 30 determines whether or not to turn on the controllable bidirectional AC switch 26 according to the voltage polarity of the AC power source and the magnetic field of the rotor. In this embodiment, during the starting stage, when the detected rotor magnetic field is North and the polarity of the AC power source is positive, or the detected rotor magnetic field is South and the polarity of the AC power source is negative, the MCU 30 outputs the trigger pulse to the controllable bidirectional AC switch 26 instantly at the zero voltage crossing point of the AC power source. During operating stage, when the detected rotor magnetic field is North and the polarity of the AC power source is positive, or the detected rotor magnetic field is South and the polarity of the AC power source is negative, the MCU 30 outputs the trigger pulse to the controllable bidirectional AC switch 26 after a predetermined firing angle corresponding to the voltage value of the AC power source.

During the starting and operating stages, when the detected rotor magnetic field is North and the polarity of the AC power source is negative, or the detected rotor magnetic field is South and the polarity of the AC power source is positive, the MCU 30 does not output a trigger pulse to the control electrode of the controllable bidirectional AC switch 26.

Figure 2B:
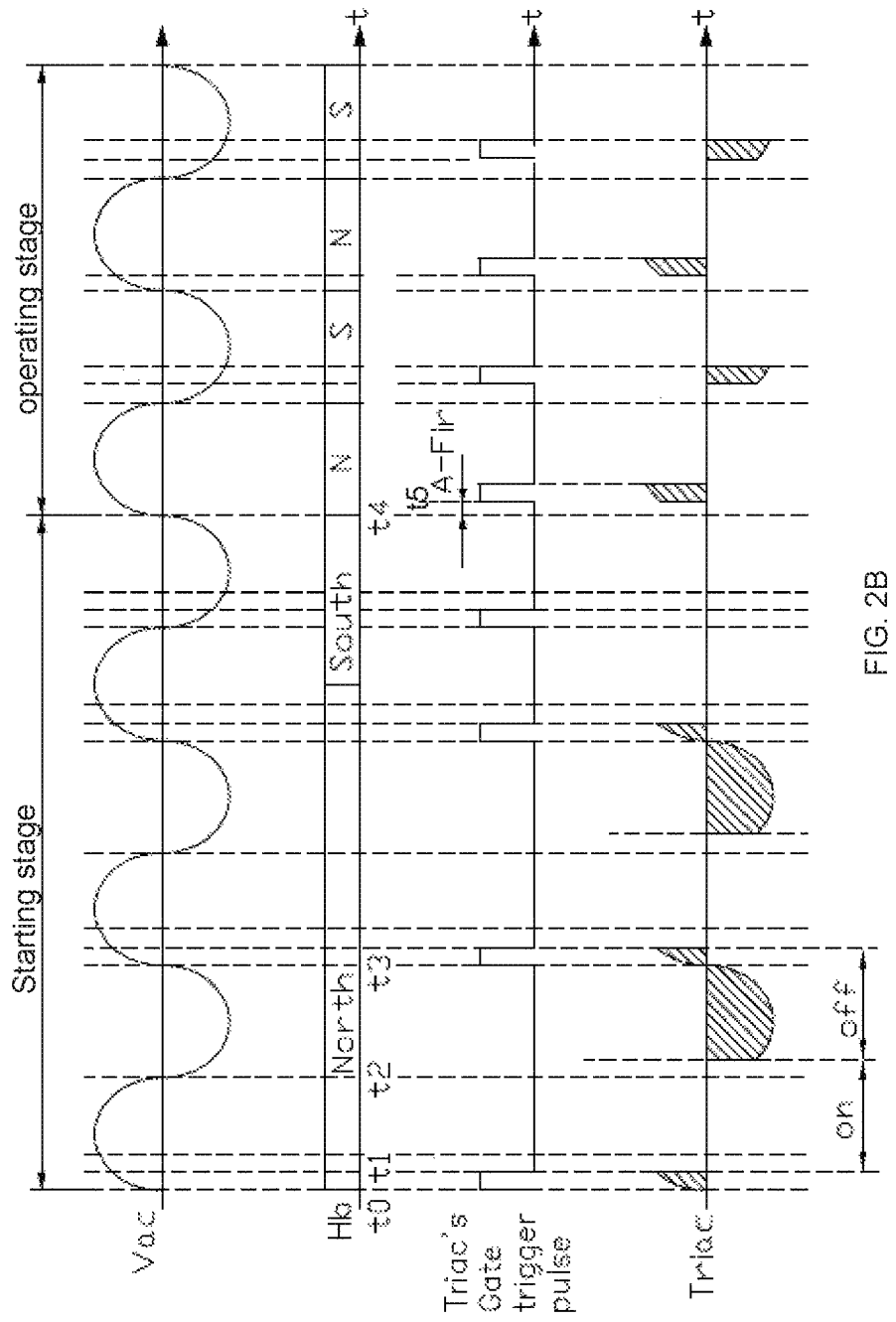
FIG. 2B is a waveform of the motor driving circuit of FIG. 1 when a load of a motor is pure inductive load.

Referring to FIG. 2A, the time instant t0 is one of the zero voltage crossing points of the AC power source. The rotor magnetic field detected by the position sensor 20 is North at the time instant t0. The voltage polarity of the AC power source following the time instant t0 is positive. Thus, the MCU 30 outputs the trigger pulse to the controllable bidirectional AC switch 26 at the time instant t0 to turn on the controllable bidirectional AC switch 26. In operation, the MCU 30 sends the trigger pulse to the control pole of the controllable bidirectional AC switch 26, the trigger pulse has a pulse width, and the controllable bidirectional AC switch 26 will be turned on after the period of the pulse width after the voltage crosses zero point, that is, it is turned on at time instant t1. Preferably, if a pulse width of the trigger pulse does not reach a scheduled length, or an amplitude of the trigger pulse does not reach a trigger current, the controllable bidirectional AC switch 26 will not be activated. After the controllable bidirectional AC switch 26 is turned on, current flowing through the stator winding 16 induces Bemf in the stator winding 16 to produce the expected torque and drive the rotor 14 to rotate in a predetermined direction, such as clockwise. At the time instant t2 (a next zero voltage crossing point of the AC power source), the rotor magnetic field detected by the position sensor 20 is still North. The voltage polarity of the AC power source following the time instant t2 is negative. Thus, the MCU 30 does not act. As a result, the MCU 30 does not output a trigger pulse to the controllable bidirectional AC switch 26. The controllable bidirectional AC switch 26 will automatic shut off when the current flowing through the controllable bidirectional AC switch 26 is close to zero. In fact, when the motor has a very small inductance, like a pure resistance load, the current from the AC power source 24 is close to 0 ampere at the zero voltage crossing point of the AC power source 24, which is less than a holding current threshold of the controllable bidirectional AC switch. The controllable bidirectional AC switch 26 is thus turned off. In other embodiments, if the motor has a high inductive load, the time instant when the current is close to 0 ampere occurs at a moment later than the zero voltage crossing point of the AC power source 24. Referring to FIG. 2B, the controllable bidirectional AC switch 26 is turned off at the moment later than the time instant t2. The current flowing through the stator winding 16 is very small (since the reactive energy stored in the stator winding 16 is very small) and generates very small driving force for the rotor 14, therefore, the rotor 14 continues to rotate clockwise due to inertia. At the time instant t3 (a next zero voltage crossing point of the AC power source), the rotor magnetic field detected by the position sensor 20 is still North. The voltage polarity of the AC power source following the time instant t3 is positive. Thus, the operation of the MCU 30 is similar to that at the time instant t0, there is no need to repeat the description.

When the rotor magnetic field detected by the position sensor 20 changes, or after waiting for a predetermined time (such as a few seconds) after the motor is powered on, the MCU 30 determines that the motor starts to rotate and enters the operating stage. During the motor operating stage, the MCU 30 detects the voltage value of the AC power source 24, for example, the voltage value of the AC power source 24 obtained is 115V. According to the lookup table shown in Table 1, the trigger angle of the controllable bidirectional AC switch 26 can be determined to be BB, for example, the angle is 30 degrees. At the time instant t4 (a next zero voltage crossing point of the AC power source), the rotor magnetic field detected by the position sensor 20 is North, the voltage polarity of the AC power source following the time instant t4 is positive, the MCU 30 may output the trigger pulse to the controllable bidirectional AC switch 26 according to the firing angle (A-Fir in FIG. 2A) determined in the lookup table shown in Table 1, that is, the MCU 30 outputs the trigger pulse to the controllable bidirectional AC switch 26 at the time instant t5 to turn on the controllable bidirectional AC switch 26. The controllable bidirectional AC switch 26 will be turned on after the period of the pulse width and firing angle A-Fir after the voltage crosses zero point. At the time instant t6, the controllable bidirectional AC switch 26 will automatic shut off when the current flowing through the controllable bidirectional AC switch 26 is close to zero. Also, at the time instant t6, a next zero voltage crossing point of the AC power source is detected, the rotor magnetic field detected by the position sensor 20 is South, the voltage polarity of the AC power source following the time instant t6 is negative. The MCU 30 outputs the trigger pulse to the controllable bidirectional AC switch 26 at the time instant t7 to turn on the controllable bidirectional AC switch 26. The controllable bidirectional AC switch 26 will be turned on after the period of the pulse width and firing angle A-Fir after the voltage crosses zero point. During the operating stage, the subsequent operation of the MCU 30 is similar to that of the same condition as described above, and there is no need to repeat. The control method of the MCU 30 throughout the above procedure is described in Table 3.

TABLE 3

Control method of the MCU

| voltage polarity of the AC power source | detected rotor magnetic field | MCU's operation |
|---|---|---|
| positive | North | output trigger pulse to the controllable bidirectional AC switch |
| negative | North | No action (does not output trigger pulse to the controllable bidirectional AC switch) |
| negative | South | output trigger pulse to the controllable bidirectional AC switch |

TABLE 3-continued

Control method of the MCU

| voltage polarity of the AC power source | detected rotor magnetic field | MCU's operation |
|---|---|---|
| positive | South | No action (does not output trigger pulse to the controllable bidirectional AC switch) |

Figure 3:
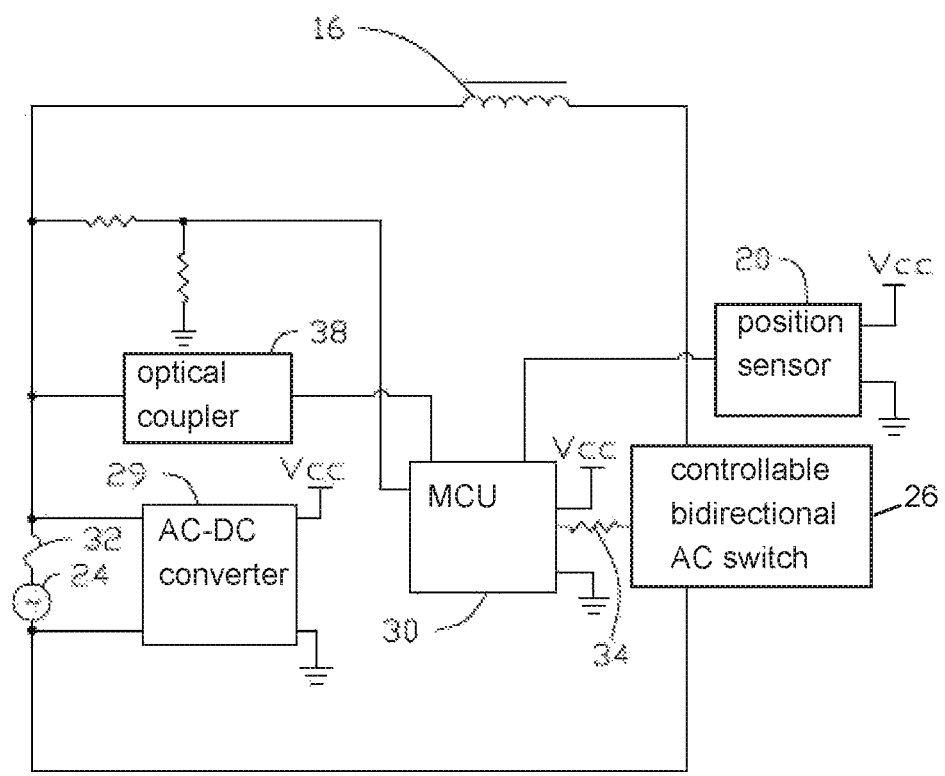
FIG. 3 is a circuit diagram of a motor driving circuit according to a second embodiment of the present disclosure.

Referring to FIG. 3, a block diagram of a motor driving circuit according to a second embodiment of the present disclosure is shown. Compared to the first embodiment, the zero crossing detection end of the MCU 30 detects the zero voltage crossing point of the AC power source through an optical coupler 38. It can be understood that, the MCU 30 also can obtain the information of the AC power source 24 through an electric-field coupling way (such as transformer coupling). When the optical coupler or the electric-field coupling is adopted, there is no need to include the clamping circuit at the zero crossing detection end of the MCU 30.

Figure 4:
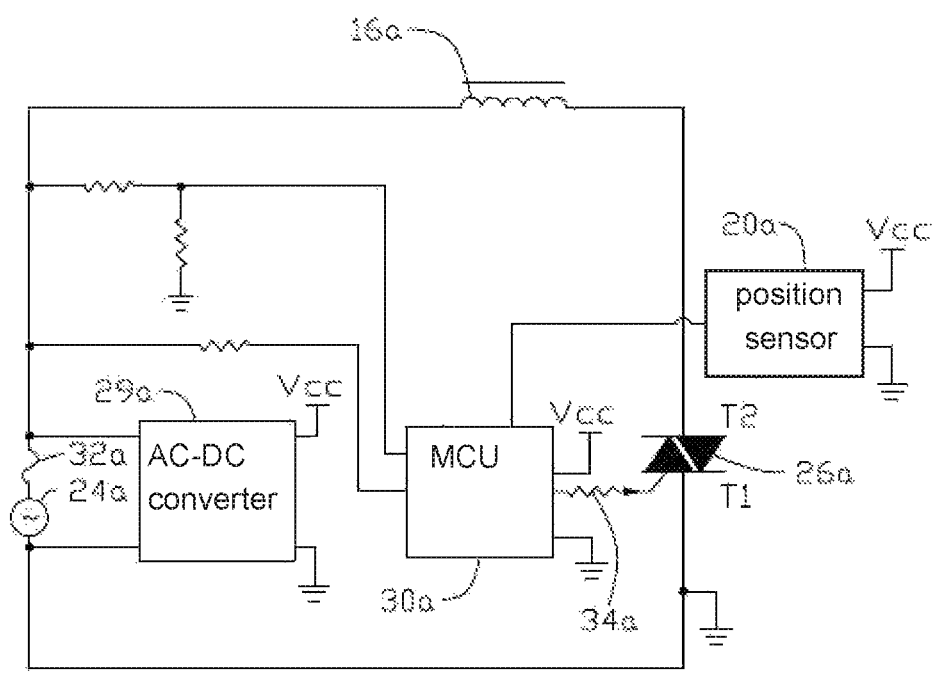
FIG. 4 is a circuit diagram of a motor driving circuit according to a third embodiment of the present disclosure.

FIG. 4 is a block diagram of a motor driving circuit according to a third embodiment of the present disclosure. In the embodiment, the motor driving circuit includes a TRIAC 26a, an MCU 30a, a position sensor 20a, an AC-DC converter 29a, and a fuse 32a. A first end of an AC power source 24a is connected to a second anode T2 of the TRIAC 26a via the fuse 32a and a stator winding 16a. A first anode T1 of the TRIAC 26a is connected to a second end of the AC power source 24a, and also grounded. The AC-DC converter 29a is connected between the first end and the second end of the AC power source 24 via the fuse 32a, configured to convert the alternating current into a low direct current voltage and output the same through a power supply terminal Vcc. The position sensor 20a, MCU 30a are connected to the power supply terminal Vcc to receive an operating voltage. The MCU 30a obtains a signal representing the magnetic pole position of the rotor output from the position sensor 20a and is connected to a control electrode of the TRIAC 26a via a resistor 34a.

Figure 5:
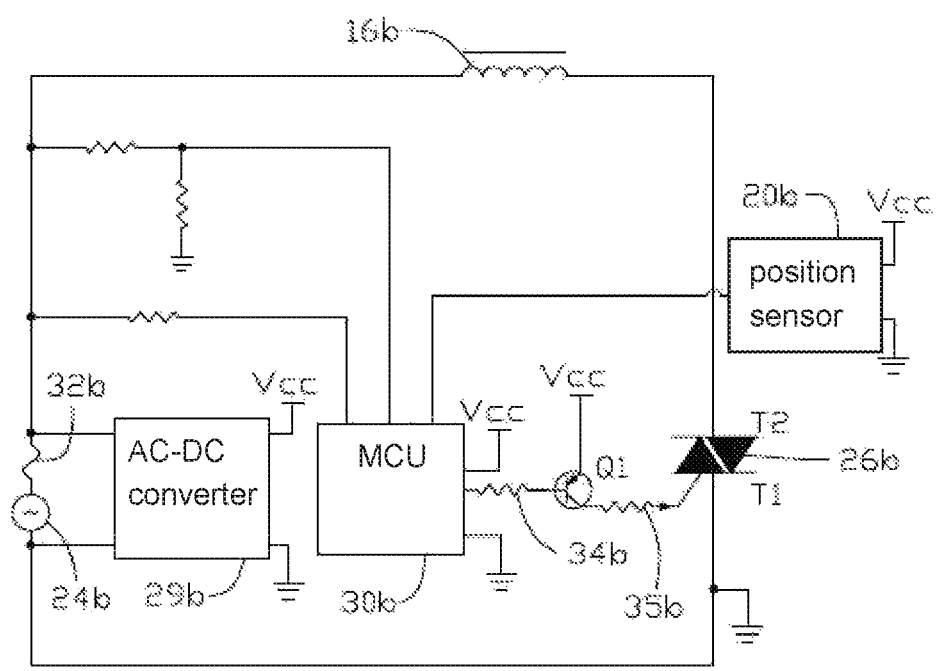
FIG. 5 is a circuit diagram of a motor driving circuit according to a fourth embodiment of the present disclosure.

FIG. 5 is a block diagram of a motor driving circuit according to a fourth embodiment of the present disclosure. In the embodiment, the motor driving circuit includes a TRIAC 26b, an MCU 30b, a position sensor 20b, an AC-DC converter 29b, and a fuse 32b, and a resistor 34b. The main difference between the fourth embodiment and the third embodiment is that, the motor driving circuit further includes a transistor Q1 and a resistor 35b, a base of the transistor Q1 is connected to the MCU 30b via the resistor 34b, an emitter of the transistor Q1 is connected to the power supply terminal Vcc, and a collector of the transistor Q1 is connected to the control electrode of the TRIAC 26b via a resistor 35b. In the embodiment, when a driving capability of the MCU 30b is insufficient to drive the TRIAC 26b, the transistor Q1 is connected between the MCU 30b and the control electrode of the TRIAC 26b to amplify a current to the control electrode of the TRIAC 26b.

Figure 6:
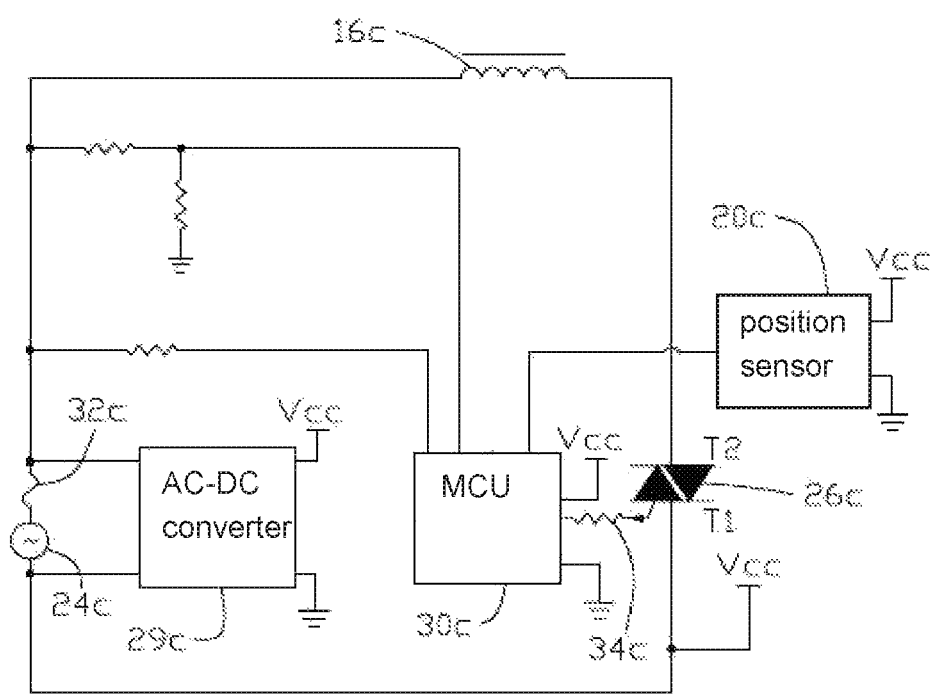
FIG. 6 is a circuit diagram of a motor driving circuit according to a fifth embodiment of the present disclosure.

FIG. 6 is a block diagram of a motor driving circuit according to a fifth embodiment of the present disclosure. In the embodiment, the motor driving circuit includes a TRIAC 26c, an MCU 30c, a position sensor 20c, an AC-DC converter 29c, and a fuse 32c and a resistor 34c. The AC/DC converter 29c is connected to the AC power source 24c. The main difference between the fifth embodiment and the third embodiment is that, the first anode T1 of the TRIAC 26c is connected to the power supply terminal Vcc, and the current flows from the control electrode of the TRIAC 26c to the MCU 30c.

Figure 7:
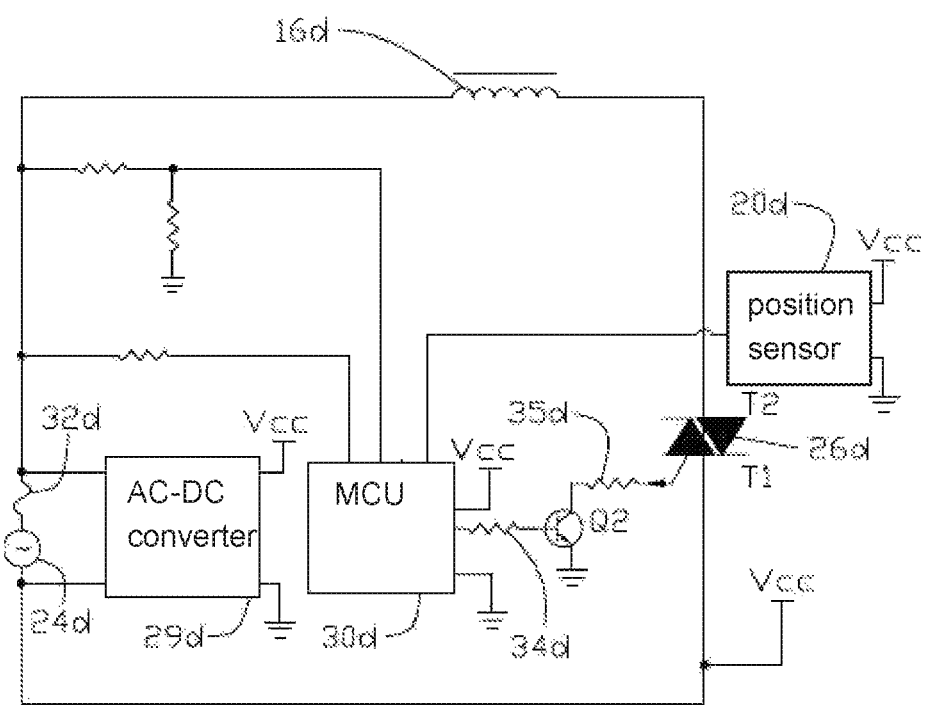
FIG. 7 is a circuit diagram of a motor driving circuit according to a sixth embodiment of the present disclosure.

FIG. 7 is a block diagram of a motor driving circuit according to a sixth embodiment of the present disclosure. In the embodiment, the motor driving circuit includes a TRIAC 26d, an MCU 30d, a position sensor 20d, a fuse 32d, and an AC-DC converter 29d. The AC/DC converter 29d is connected to an AC power source 24d. The main difference between the sixth embodiment and the fifth embodiment is that, the motor driving circuit further includes a transistor Q2 and a resistor 35d, a base of the transistor Q2 is connected to the MCU 30d via a resistor 34d, an emitter of the transistor Q2 is grounded, and a collector of the transistor Q2 is connected to the control electrode of the TRIAC 26d via the resistor 35d. In the embodiment, the transistor Q2 is connected between the MCU 30d and the control electrode of the TRIAC 26d to amplify a current to the control electrode of the TRIAC 26d.

Figure 8A:
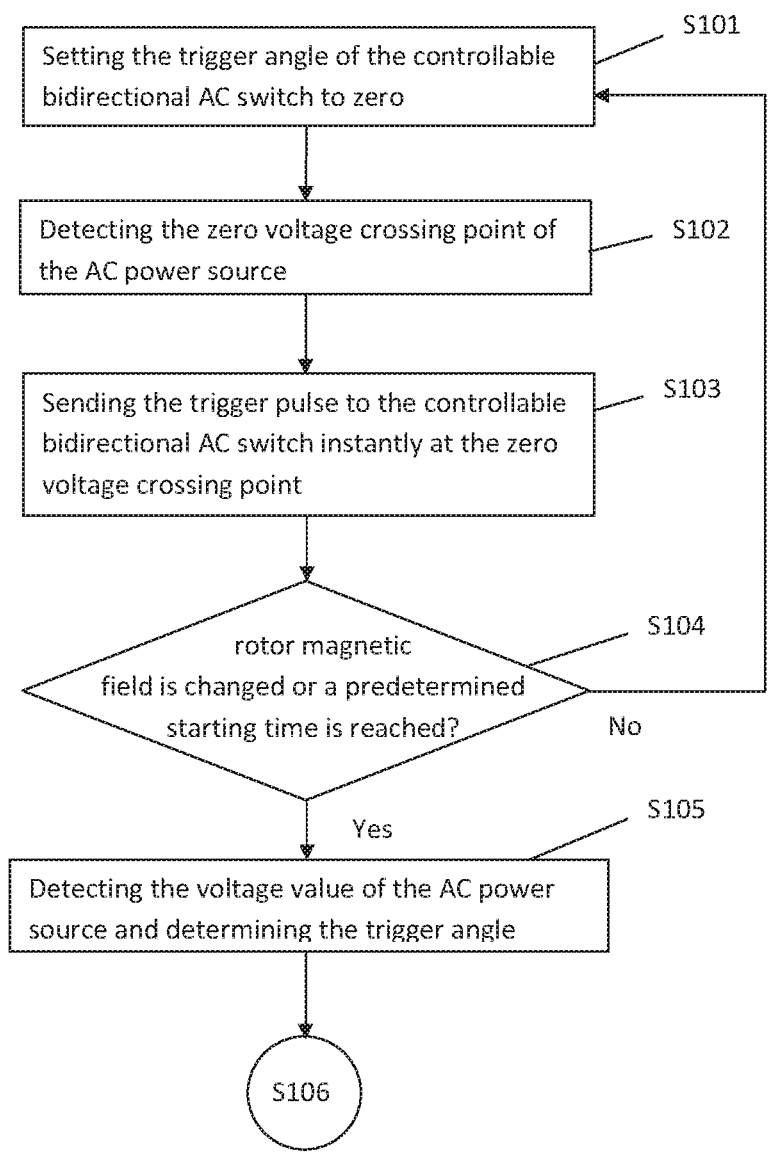
FIG. 8A and FIG. 8B are flowcharts of a motor driving method according to a seventh embodiment of the present disclosure.
Figure 8B:
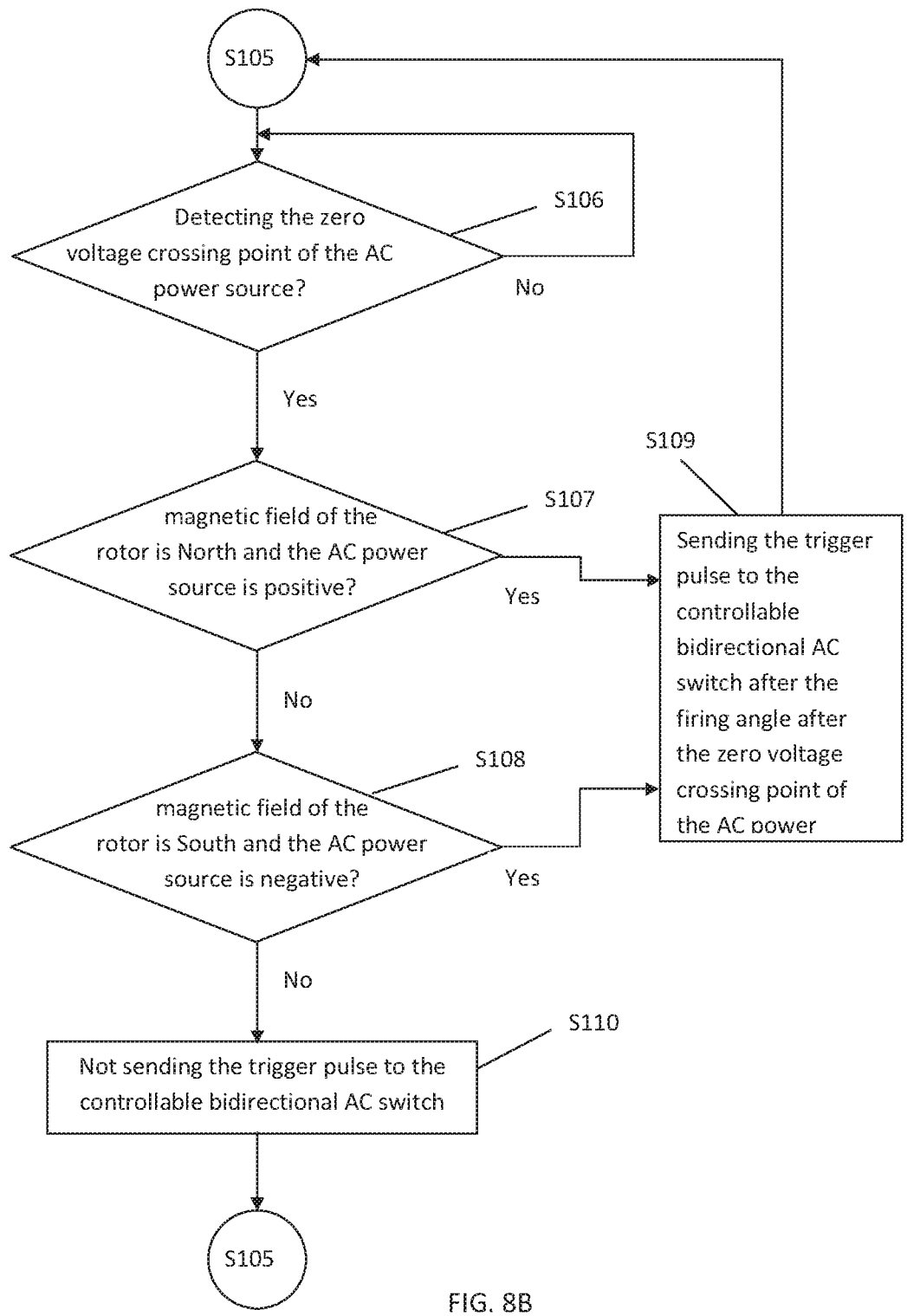

Referring to FIGS. 8A and 8B, a motor driving method according to a seventh embodiment of the present disclosure comprising:

S101: Setting the trigger angle of the controllable bidirectional AC switch to zero.

S102: Detecting the zero voltage crossing point of the AC power source.

S103: When the detected rotor magnetic field is North and the polarity of the AC power source is positive, or the detected rotor magnetic field is South and the polarity of the AC power source is negative following the zero voltage crossing point, sending a trigger pulse to the controllable bidirectional AC switch instantly at the zero voltage crossing point of the AC power source.

When the detected rotor magnetic field is North and the polarity of the AC power source is negative, or the detected rotor magnetic field is South and the polarity of the AC power source is positive, not sending a trigger pulse to the controllable bidirectional AC switch.

S104: Determining whether the rotor magnetic field is changed or determining whether a predetermined starting time is reached. If yes, execute step S105; otherwise, execute step S101.

S105: Detecting the voltage value of the AC power source and determining the trigger angle of the controllable bidirectional AC switch according to the voltage value of the AC power source.

S106: Detecting the zero voltage crossing point of the AC power source, if the zero voltage crossing point of the AC power source is detected, execute step S107, if the zero voltage crossing point of the AC power source is not detected, execute step S106 repeatedly.

S107: Detecting whether the magnetic field of the rotor is North and the AC power source is positive, if yes, execute step S109, and if no, execute step S108.

S108: Detecting whether the magnetic field of the rotor is South and the AC power source is negative, if yes, execute step S109, and if no, execute step S110.

S109: Sending the trigger pulse to the controllable bidirectional AC switch after the firing angle after the zero voltage crossing point of the AC power source, then executing the step S105.

S110: Not sending the trigger pulse to the controllable bidirectional AC switch 26, then executing the step S105.

In the above method, during the motor starting stage, the MCU instantly sends the trigger pulse to the controllable bidirectional AC switch when the polarity of the AC power source corresponds to the magnetic field of the rotor, so that the motor provides a high starting torque during the starting stage. During the operating stage of the motor, when the polarity of the AC power source corresponds to the magnetic field of the rotor, the trigger pulse is sent to the controllable bidirectional AC switch after a delay time of firing angle after a zero voltage crossing point of the AC power source to reduce the current flowing through the windings of the motor, thereby reducing waste of electrical energy.

It can be understood by those skilled in the art that, in the above steps, the firing angle can be replaced with the delay time. The firing angle or the delay time may be determined based on the voltage value of the AC power source 24. The firing angle or the delay time also may be determined based on at least one of the parameters including voltage value of the AC power source, frequency of the AC power source, inductance value of the stator winding, internal resistance of the stator winding, temperature of the motor, temperature of environment surrounding the motor, and temperature of the MCU. The operation of the MCU 30 also may be adjusted accordingly.

It can be noted that, the steps shown in FIG. 8A and FIG. 8B do not necessarily follow the order shown in the figure, some of the steps may be reversed, and two adjacent steps are not necessarily continuous, can be executed at the same time. For example, the steps S108 may be implemented firstly, and the step S107 may be implemented secondly.

In the above embodiments, the frequency of detecting the voltage value of the AC power source and the frequency of determining the firing angle according to the voltage value of the AC power source can be adjusted according to design requirements.

In the above embodiments, if the firing angle or the delay time is determined based on the inductance value of the stator winding, it is not necessary for repeatedly reading the inductance value, the inductance value of the stator winding is obtained once.

In the embodiments of the present disclosure, the MCU can control the operation of the motor through an internal program, therefore simplifying circuit configuration. A person skilled in the art can understand that the motor provided by the embodiments of the present disclosure is suitable for driving various devices such as a water pump, a fan, etc., and more particularly suitable for driving a large circulating pump with a large impeller. When a large circulating pump is put into water, during the starting stage, the motor outputs a higher starting torque to drive the impeller from a stationary state to a rotating state. Once the rotor of the motor is successfully started, the trigger pulse to a controllable bidirectional AC switch is output after a delay time after a zero voltage crossing point of the AC power source, such that a reaction motor torque generated by the 180-degree phase difference between back electromotive force and motor current is decreased and the wastage of electrical energy is reduced. Therefore, the power utilization efficiency can be greatly improved, and resource conservation and environmental protection can be enhanced.

The motor described in the embodiments of the present disclosure is a permanent magnet AC motor, such as a permanent magnet synchronous motor and a permanent magnet BLDC motor. The motor of the embodiments of the present disclosure is preferably a single-phase permanent magnet AC motor, such as a single-phase permanent magnet synchronous motor, a single-phase permanent magnet BLDC motor. When the motor is a permanent magnet synchronous motor, the AC power source is a commercial power source; when the motor is a permanent magnet BLDC motor, the AC power source is output by the inverter.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A driving circuit for a motor comprising a stator and a permanent magnet rotor, the stator comprising a stator core and a stator winding wound on the stator core, wherein the driving circuit comprises:
   a controllable bidirectional AC switch connected in series with the stator winding between two ends of an AC power source; and
   a processing unit, configured to instantly send a trigger pulse to the controllable bidirectional AC switch, when a detected rotor magnetic field is a first polarity and a polarity of the AC power source is positive, or the detected rotor magnetic field is a second polarity and the polarity of the AC power source is negative after a zero voltage crossing point of the AC power source, during a motor starting stage; and
   the processing unit configured to send the trigger pulse to the controllable bidirectional AC switch after a delay time after the zero voltage crossing point, when the detected rotor magnetic field is the first polarity and the polarity of the AC power source is positive, or the detected rotor magnetic field is the second polarity and the polarity of the AC power source is negative after the zero voltage crossing point of the AC power source, during a motor operating stage,
   wherein the controllable bidirectional AC switch is a TRIAC, a first anode of the TRIAC is grounded or receives a low direct current voltage, the first anode of the TRIAC is also connected to a first end of the AC power source, a second anode of the TRIAC is connected to a second end of the AC power source via the stator winding and a fuse, and a control electrode of the TRIAC is connected to the processing unit via a resistor.

2. The driving circuit according to claim 1, wherein the processing unit determines whether the motor enters the operating stage from the starting stage by detecting whether a magnetic pole position signal indicating the magnetic field of the rotor is changed.

3. The driving circuit according to claim 1, wherein the delay time is determined based on at least one of parameter consisting of voltage value of the AC power source, frequency of the AC power source, inductance value of the stator winding, internal resistance of the stator winding, temperature of the motor, and temperature of environment surrounding the motor, and the temperature of environment surrounding the motor is obtained by a temperature sensor built in the processing unit.

4. A motor comprising the driving circuit of claim 1, and the motor being a single phase permanent magnet synchronous machine or a single phase permanent magnet BLDC motor.

5. The motor according to claim 4, wherein the processing unit determines whether the motor enters the operating stage from the starting stage by detecting whether a magnetic pole position signal indicating the magnetic field of the rotor is changed.

6. The motor according to claim 4, wherein the delay time is determined based on at least one parameter consisting of voltage value of the AC power source, frequency of the AC power source, inductance value of the stator winding, internal resistance of the stator winding, temperature of the motor, and temperature of environment surrounding the motor, and the temperature of environment surrounding the motor is obtained by a temperature sensor built in the processing unit.

7. A driving circuit for a motor comprising a stator and a permanent magnet rotor, the stator comprising a stator core and a stator winding wound on the stator core, wherein the driving circuit comprises:
  a controllable bidirectional AC switch connected in series with the stator winding between two ends of an AC power source; and
  a processing unit, configured to instantly send a trigger pulse to the controllable bidirectional AC switch, when a detected rotor magnetic field is a first polarity and a polarity of the AC power source is positive, or the detected rotor magnetic field is a second polarity and the polarity of the AC power source is negative after a zero voltage crossing point of the AC power source, during a motor starting stage; and
  the processing unit configured to send the trigger pulse to the controllable bidirectional AC switch after a delay time after the zero voltage crossing point, when the detected rotor magnetic field is the first polarity and the polarity of the AC power source is positive, or the detected rotor magnetic field is the second polarity and the polarity of the AC power source is negative after the zero voltage crossing point of the AC power source, during a motor operating stage,
wherein the controllable bidirectional AC switch is a TRIAC, a first anode of the TRIAC is grounded or receives a low direct current voltage, the first anode of the TRIAC is also connected to a first end of the AC power source, a second anode of the TRIAC is connected to a second end of the AC power source via the stator winding and a fuse, and a control electrode of the TRIAC is connected to the processing unit via a resistor.

* * * * *